US008226925B2

(12) United States Patent
Corma Canos et al.

(10) Patent No.: US 8,226,925 B2
(45) Date of Patent: Jul. 24, 2012

(54) MICROPOROUS CRYSTALLINE MATERIAL OF ZEOLITIC NATURE, ZEOLITE ITQ-39, METHOD OF PREPARATION AND USES (75) Inventors: Avelino Corma Canos, Valencia (ES); Manuel Moliner Marin, Valencia (ES); Fernando Rey Garcia, Valencia (ES); Jorge Gonzalez Gonzalez, Valencia (ES)

(73) Assignee: Consejo Superior de Investigaciones Cientificas (ES)

( * ) Notice: Subject to any disclaimer, the term of this patent is extended or adjusted under 35 U.S.C. 154(b) by 366 days.

(21) Appl. No.: 12/525,506

(22) PCT Filed: Jan. 31, 2008

(86) PCT No.: PCT/ES2008/070014
§ 371 (c)(1),
(2), (4) Date: Jul. 31, 2009

(87) PCT Pub. No.: WO2008/092984
PCT Pub. Date: Aug. 7, 2008

(65) Prior Publication Data
US 2009/0312177 A1 Dec. 17, 2009

(30) Foreign Application Priority Data
Feb. 1, 2007 (ES) .................................. 200700334

(51) Int. Cl.
*C01B 39/46* (2006.01)
*C01B 39/48* (2006.01)

(52) U.S. Cl. ............. 423/718; 423/706; 502/73; 502/74

(58) Field of Classification Search .................. 423/706, 423/718; 502/73, 74
See application file for complete search history.

(56) References Cited

U.S. PATENT DOCUMENTS

| 5,007,997 | A | * | 4/1991 | Zones et al. | .................... 208/46 |
| 6,027,707 | A | * | 2/2000 | Casci et al. | .................... 423/705 |
| 6,306,364 | B1 | * | 10/2001 | Valencia et al. | .................... 423/713 |
| 7,022,308 | B1 | * | 4/2006 | Yuen et al. | .................... 423/706 |
| 7,998,457 | B2 | * | 8/2011 | Burton et al. | .................... 423/718 |
| 2003/0185751 | A1 | * | 10/2003 | Chester et al. | .................... 423/705 |
| 2009/0214418 | A1 | * | 8/2009 | Burton et al. | .................... 423/706 |
| 2010/0322847 | A1 | * | 12/2010 | Xiao et al. | .................... 423/709 |

FOREIGN PATENT DOCUMENTS

| EP | 1010667 A1 | 6/2000 |
| WO | 2005/030646 A1 | 4/2005 |
| WO | 2005/113438 A1 | 12/2005 |

*Primary Examiner* — David M Brunsman
(74) *Attorney, Agent, or Firm* — K&L Gates LLP

(57) ABSTRACT

Described herein are zeolite microporous crystalline materials comprising, in the heated state and in the absence of defects in its crystalline framework manifested by the presence of silanols, the empirical formula:

$x(M_{1/n}XO_2):yYO_2:SiO_2,$ wherein M is selected from $H^+$, an inorganic cation of charge +n, and mixtures thereof, X is at least one chemical element having an oxidation state of +3, Y is at least one second chemical element other than Si having an oxidation state +4, x has a value between 0 and about 0.3, y has a value between 0 and about 0.1, and wherein the synthesized material has an X-ray diffraction pattern having at least values of angle $2\theta$ (degrees) and relative intensities ($I/I_0$) described. Process of making the microporous crystalline materials are also disclosed.

18 Claims, 3 Drawing Sheets

MICROPOROUS CRYSTALLINE MATERIAL OF ZEOLITIC NATURE, ZEOLITE ITQ-39, METHOD OF PREPARATION AND USES

CROSS REFERENCE TO RELATED APPLICATIONS

This application is a national phase of PCT/ES2008/070014 filed on Jan. 31, 2008 which claims priority to Spanish application No. P200700334 filed on Feb. 1, 2007, the entire disclosures of which are incorporated herein by reference.

FIELD OF THE INVENTION

Some example embodiments of the present invention generally relate to zeolite microporous crystalline materials and processes for making these materials.

BACKGROUND

Zeolites are microporous crystalline materials formed by a framework of $TO_4$ tetrahedra sharing all their vertices and giving rise to three-dimensional structures containing channels and/or cavities of molecular dimensions. They are of variable composition and T generally represents atoms with a formal oxidation state of +3 or +4, such as Si, Ge, Ti, Al, B, Ga, and the like. When any of the T atoms has an oxidation state of less than +4, the crystalline framework formed presents negative charges that are compensated by the presence of organic or inorganic cations in the channels or cavities. These channels and cavities can also hold organic molecules and $H_2O$, so the resulting chemical composition of the zeolites can be represented by empirical formula:

$$x(M_{1/n}XO_2):yYO_2:zR:wH_2O$$

where M is one or more organic or inorganic cations with a charge +n; X is one or more trivalent elements; Y is one or more tetravalent elements, generally Si; and R is one or more organic cations. Although the nature of M, X, Y and R and the values of x, y, z, y and w can be modified by post-synthesis treatments, the chemical composition of a zeolite (as it is synthesised or after heating) has a range that is characteristic of each zeolite and its method of preparation.

The crystalline structure of each zeolite, with a specific system of channels and cavities gives rise to a characteristic X-ray diffraction pattern, which enables differentiation between them.

Many zeolites have been synthesised in the presence of an organic molecule that acts as a directing agent for the structure. The organic molecules that act as structure directing agents (SDA) generally contain nitrogen in their composition and can give rise to stable organic cations in the reaction medium.

The mobilisation of the precursor species during synthesis of zeolites can be carried out in the presence of hydroxyl groups and an alkaline medium, which can be introduced as the hydroxide of the same SDA, such as, for example, tetrapropylammonium hydroxide in the case of zeolite ZSM-5. Fluoride ions can also act as mobilising agents in the synthesis of zeolites. For example, in the patent EP-A-337479, the use of HF in water at low pH is disclosed as a mobilising agent of silica for the synthesis of zeolite ZSM-5.

SUMMARY

The present description describes a zeolite microporous crystalline material ITQ-39, comprising, in the heated state and in the absence of defects in its crystalline framework manifested by the presence of silanols, the empirical formula:

$$x(M_{1/n}XO_2):yYO_2:SiO_2,$$

wherein M is selected from $H^+$, an inorganic cation of charge +n, and mixtures thereof,
X is at least one chemical element having an oxidation state of +3,
Y is at least one second chemical element other than Si having an oxidation state +4,
x has a value between 0 and about 0.3,
y has a value between 0 and about 0.1,
and wherein the synthesized material has an X-ray diffraction pattern having at least values of angle $2\theta$ (degrees) and relative intensities ($I/I_0$) shown in Table 1.

TABLE I

| $2\theta$ (degrees) ± 0.5 | Intensity ($I/I_0$) |
|---|---|
| 7.8 | f |
| 8.5 | d (h) |
| 15.8 | d |
| 19.3 | d |
| 21.4 | m |
| 22.0 | f |
| 22.8 | mf |
| 26.2 | d |
| 27.5 | d |
| 32.0 | d |
| 43.5 | d |

Also described herein are processes for synthesising the microporous crystalline material, comprising the steps of: forming a reaction mixture comprising
  a source of $SiO_2$,
  a source of one or more tetravalent elements Y selected from the group consisting of Ge, Ti, Sn, V and mixtures thereof,
  a source of one or more trivalent elements X selected from the group consisting of Al, B, Ga, Fe, Cr and mixtures thereof,
  a source of inorganic cations M having a charge +n,
  a source of an organic dication SDA-1 having the structure of Formula 1

Formula 1 a source of fluoride ions and
  water;
heating the reaction mixture to a temperature of between about 80° C. and about 200° C. until crystallisation is achieved; and forming the microporous crystalline material, wherein the material has a composition in the ranges:
  $SDA-1(OH)_2/SiO_2=0.01-1.0$,
  $M_{1/n}OH/SiO_2=0-1.0$,
  $X_2O_3/SiO_2=0-0.15$, $YO_2/SiO_2=0-0.1$,
$F/SiO_2=0.1-3.0$, and
$H_2O/SiO_2=0.5-50$.

In one embodiment described herein, the microporous crystalline materials produced can be palletized in accordance with known techniques and used as a catalyst or catalyser component in processes of transformation of organic compounds or as an absorbent in a processes of absorption and separation of organic compounds. The material used in the above applications can be in its acid form and/or exchanged with suitable cations.

DETAILED DESCRIPTION

Presently described is a microporous crystalline zeolite, identified as "zeolite ITQ-39", and the process of its preparation. This material, both in heated and synthesised forms without heating, have an X-ray diffraction patterns that are different from other known zeolite materials, and therefore, characteristic of this material.

One example embodiment described herein is a zeolite microporous crystalline material that has, in the heated state and in the absence of defects in its crystalline framework manifested by the presence of silanols, the empirical formula:

wherein

M is selected from H$^+$, an inorganic cation of charge +n, and mixtures thereof, X is at least one chemical element having an oxidation state of +3, Y is at least one second chemical element other than Si having an oxidation state +4, x has a value between 0 and about 0.3, y has a value between 0 and about 0.1, and wherein the synthesized material has an X-ray diffraction pattern with at least the values of angle 2θ (degrees) and relative intensities (I/I$_0$) shown in Table I, I$_0$ being the intensity of the most intense peak to which a value of 100 is assigned:

TABLE I

| 2θ (degrees) ± 0.5 | Intensity (I/I$_0$) |
|---|---|
| 7.8 | f |
| 8.5 | d (h) |
| 15.8 | d |
| 19.3 | d |
| 21.4 | m |
| 22.0 | f |
| 22.8 | mf |
| 26.2 | d |
| 27.5 | d |
| 32.0 | d |
| 43.5 | d | wherein d has a weak intensity between 0 and 20%, m has a medium intensity between 20 and 40%, f has a strong intensity between 40 and 60%, mf has a very strong intensity between 60 and 100%, and h has a peak of diffraction appearing as a shoulder.

The zeolite microporous crystalline material described herein, after heating to eliminate the occluded organic compounds inside, has an X-ray diffraction pattern with at least the values of angle 2θ (degrees) and relative intensities (I/I$_0$) indicated in Table II:

TABLE II

| 2θ (degrees) ± 0.5 | Intensity (I/I$_0$) |
|---|---|
| 7.8 | mf |
| 8.6 | d (h) |
| 14.8 | d |
| 15.8 | d |
| 19.4 | d |
| 21.4 | m |
| 22.1 | f |
| 23.0 | mf |
| 26.3 | m |
| 27.6 | d |
| 32.0 | d |
| 43.9 | d | wherein d, m, f, mf and h have the same meanings as described for Table 1.

In one example embodiment, the constituents of the microporous crystalline material can be as follows. Element X is selected from the group consisting of Al, Ga, B, Fe, Cr and mixtures thereof. Element Y is selected from the group consisting of Ge, Ti, Sn, V and mixtures thereof. In the empirical formula above, x has a value of less than about 0.3 and y has a value of less than about 0.05.

According to another example embodiment, the zeolite microporous crystalline material has, in the heated state and in the absence of defects in its crystalline framework manifested by the presence of silanols, the empirical formula:

wherein M is selected from H$^+$, an inorganic cation of charge +n, and mixtures thereof, X is at least one chemical element having an oxidation state of +3, selected from the group consisting of Al, Ga, B, Fe, Cr and mixtures thereof, Y is at least one second chemical element other than Si having an oxidation state of +4, selected from the group consisting of Ge, Ti, Sn, V and mixtures thereof, x has a value between 0 and about 0.3, y has a value between 0 and about 0.05, wherein the synthesized material has an X-ray diffraction pattern with at least the values of angle 2θ (degrees) and relative intensities previously mentioned (Table I) and this material has in the heated state an X-ray diffraction pattern with at least the values of angle 2θ (degrees) and relative intensities (I/I$_0$) previously mentioned (Table II).

The X-ray diffraction patterns of the microporous crystalline material, ITQ-39, were obtained by the powder method using a fixed divergence slit of ¼° and using the Kα radiation of Cu. It should be taken into account that the diffraction data listed for this sample of zeolite ITQ-39 as simple or unique lines can be formed by multiple overlaps or superpositions of reflections that, under certain conditions such as differences in crystallographic changes, can appear as resolved or partially resolved lines. Generally, crystallographic changes can include small variations in the unit cell parameters and/or changes in the crystal symmetry without these producing a change in structure. Thus, the positions, widths and relative intensities of the peaks depend to a certain extent on the chemical composition of the material and on the degree of hydration and crystal size.

Figure 2:
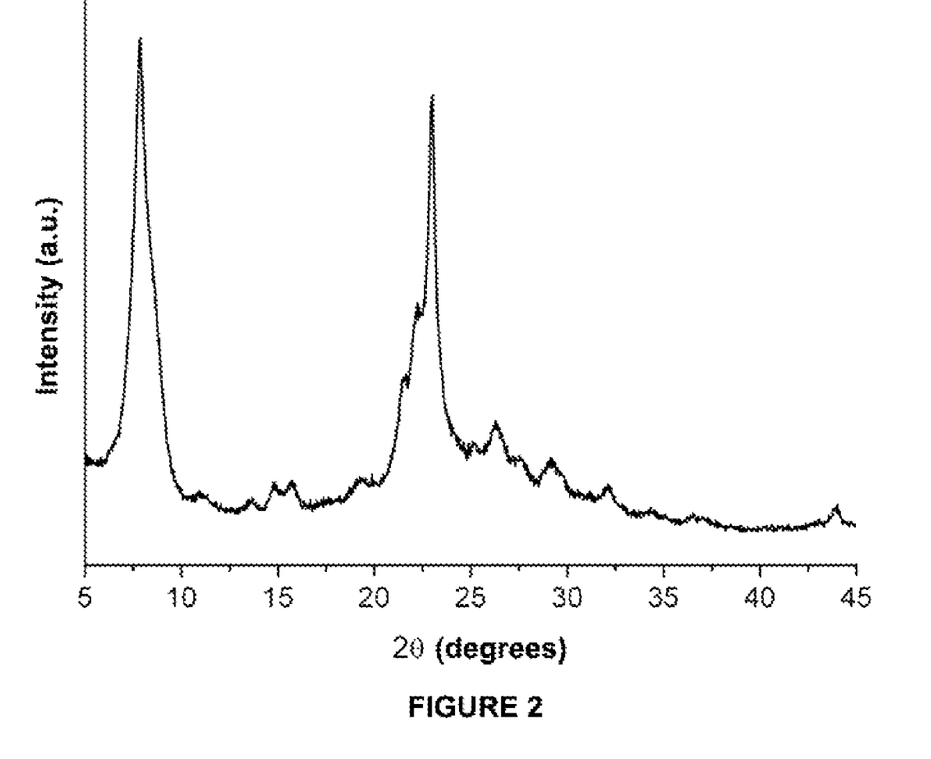
FIG. 2 illustrates characteristic peaks of the X-ray diffraction pattern of the ITQ-39 material, as synthesised according to example 5.

When the framework of the microporous crystalline material is exclusively composed of silicon and aluminium oxides in a molar ratio of Si/Al=13 and it has been synthesised in the presence of fluoride anions using the quaternary diammonium dication having the formula Formula 1 zeolite ITQ-39 presents an X-ray diffraction pattern as illustrated in FIG. 2. This diffraction pattern is characterised by the values of angle $2\theta$ (degrees) and relative intensities $(I/I_0)$ shown in Table III.

TABLE III

| $2\theta$ (degrees) | Intensity $(I/I_0)$ |
|---|---|
| 7.8198 | 49.56 |
| 8.6885 | 13.82 |
| 15.7045 | 4.51 |
| 19.2097 | 7.54 |
| 21.3591 | 32.59 |
| 22.0000 | 45.40 |
| 22.7964 | 100.00 |
| 25.0561 | 9.92 |
| 26.2576 | 13.17 |
| 27.4230 | 7.01 |
| 28.7596 | 6.87 |
| 29.4369 | 5.87 |
| 31.9616 | 5.07 |
| 34.1133 | 1.72 |
| 36.1252 | 1.17 |
| 36.7736 | 2.03 |
| 42.6035 | 1.28 |
| 43.4655 | 5.76 |

Figure 3:
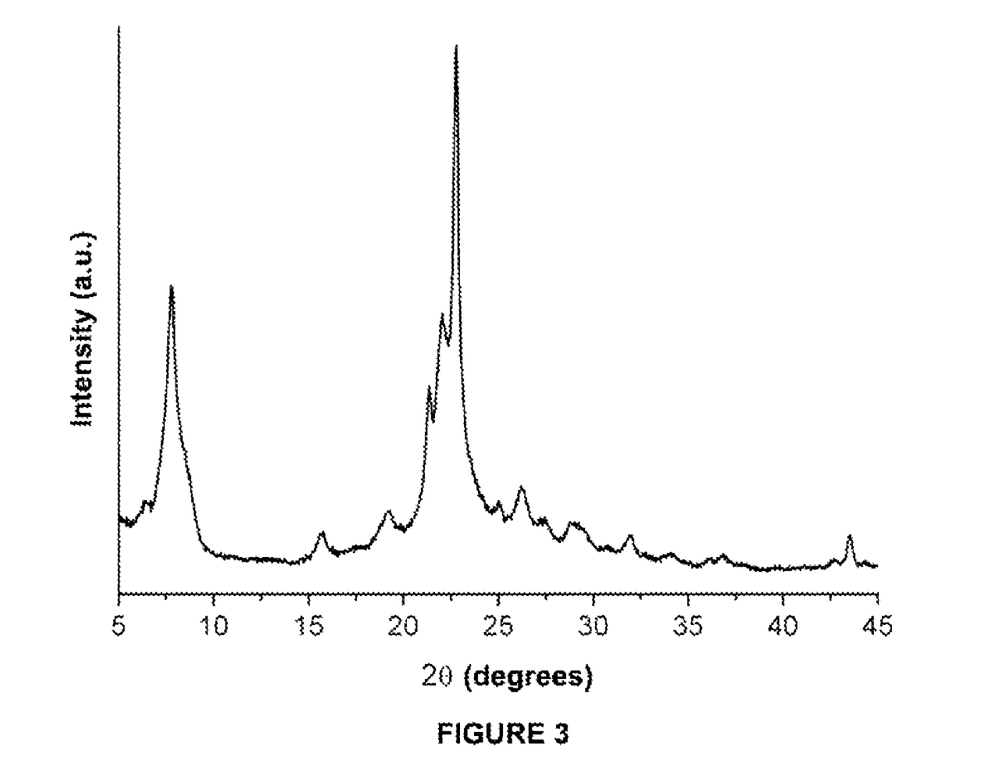
FIG. 3 illustrates characteristic peaks of the X-ray diffraction pattern of the material of example 5 after heating.

The X-ray diffraction pattern of zeolite ITQ-39 after being heated at 580° C., to eliminate occluded organic compounds inside, is illustrated in FIG. 3. This diffraction pattern is characterised by the values of angle $2\theta$ (degrees) and relative intensities $(I/I_0)$ that are shown in Table IV. Comparing the X-ray diffraction patterns of zeolite ITQ-39 as synthesised and after heating to various temperatures shows the great thermal stability of the material.

TABLE IV

| $2\theta$ (degrees) | Intensity $(I/I_0)$ |
|---|---|
| 7.8461 | 100.00 |
| 8.7039 | 37.71 |
| 11.0092 | 1.47 |
| 13.6688 | 2.40 |
| 14.7903 | 5.20 |
| 15.7731 | 5.95 |
| 19.2573 | 5.47 |

TABLE IV-continued

| $2\theta$ (degrees) | Intensity $(I/I_0)$ |
|---|---|
| 21.4378 | 28.77 |
| 22.1339 | 44.61 |
| 22.9739 | 95.99 |
| 25.1759 | 15.59 |
| 26.3257 | 20.77 |
| 27.6284 | 12.92 |
| 29.1717 | 12.52 |
| 32.1493 | 7.69 |
| 34.3923 | 2.64 |
| 36.4259 | 1.95 |
| 43.9105 | 4.31 |

Further described herein, in another example embodiment, is a process for synthesising the microporous crystalline material. The process for synthesising the microporous crystalline material comprises the steps of: forming a reaction mixture comprising one or more sources of $SiO_2$, one or more sources of the organic cation SDA-1, one or more sources of fluoride ions, and water; heating the reaction mixture to a temperature of between about 80° C. and about 200° C. until crystallisation is achieved; and forming the microporous crystalline material. The reaction mixture has a composition, in terms of molar ratios, in the ranges:
SDA-1$(OH)_2/SiO_2$=0.01-1.0,
$F/SiO_2$=0.1-3.0, and
$H_2O/SiO_2$=0.5-50.

According to another example embodiment, the reaction mixture comprises one or more sources of $SiO_2$, one or more sources of the organic cation SDA-1, one or more sources of fluoride ions, and water, and has a composition, in terms of molar ratios, in the ranges:
SDA-1$(OH)_2/SiO_2$=0.01-1.0,
$F/SiO_2$=0.1-3.0, and
$H_2O/SiO_2$=0.5-50.

According to yet another example embodiment, the reaction mixture additionally comprises a source of one or more trivalent elements X and has a composition, in terms of molar ratios, in the ranges:
SDA-1$(OH)_2/SiO_2$=0.01-1.0,
$X_2O_3/SiO_2$=0-0.15, excluding the value 0,
$F/SiO_2$=0.1-3.0, and
$H_2O/SiO_2$=0.5-50.

According to still another example embodiment, the reaction mixture additionally comprises a source of one or more other tetravalent elements Y other than Si and has a composition, in terms of molar ratios, in the ranges:
SDA-1$(OH)_2/SiO_2$=0.01-1.0,
$YO_2/SiO_2$=0-0.1, excluding the value 0,
$F/SiO_2$=0.1-3.0, and
$H_2O/SiO_2$=0.5-50.

According another example embodiment, the reaction mixture additionally comprises a source of one or more other tetravalent elements Y other than Si and source of one or more trivalent elements X, and has a composition, in terms of molar ratios, in the ranges:
SDA-1$(OH)_2/SiO_2$=0.01-1.0,
$X_2O_3/SiO_2$=0-0.15, excluding the value 0,
$YO_2/SiO_2$=0-0.1, excluding the value 0,
$F/SiO_2$=0.1-3.0, and
$H_2O/SiO_2$=0.5-50.

In an further example embodiment, the reaction mixture comprises a source of $SiO_2$, a source of one or more other tetravalent elements Y other than Si selected from the group consisting of Ge, Ti, V, Sn and mixtures thereof, a source of one or more trivalent elements X selected from the group consisting of Al, B, Ga, Fe, Cr and mixtures thereof, a source of inorganic cations M having a charge +n, selected from the alkaline metals, alkaline earths and mixtures thereof, a source of organic cation SDA-1, a source of fluoride ions and water. The reaction mixture has a composition, in terms of molar ratios, in the ranges:

SDA-1(OH)$_2$/SiO$_2$=0.1-1.0,
M$_{1/n}$OH/SiO$_2$=0-0.2
X$_2$O$_3$/SiO$_2$=0-0.07
YO$_2$/SiO$_2$=0-0.05
F/SiO$_2$=0.1-2.0,
H$_2$O/SiO$_2$=1-20.

The mixture can be heated with or without stirring to a temperature of between 80° C. and 200° C. until crystallisation is achieved.

The composition of the reaction mixture producing the microporous crystalline material can be generally represented by the following formula, with the values of parameters indicating the molar ratios:

$$rSDA\text{-}1(OH)_2 : sM_{1/n}OH : tX_2O_3 : uYO_2 : vF : SiO_2 : wH_2O$$

where M is one or more inorganic cations of charge +n, preferably alkaline metals or alkaline earths; X is one or more trivalent elements, preferably Al, B, Ga, Fe, Cr or mixtures thereof; Y is one or more tetravalent elements other than Si, preferably Ge, Ti, Sn, V or mixtures thereof; SDA-1 is the dication Formula 1

F is one or more sources of fluoride ions, preferably HF, NH$_4$F or mixtures thereof and the values of r, s, t, u, v and w are in the ranges:

r=SDA-1(OH)$_2$/SiO$_2$=0.01-1.0, preferably 0.1-1.0,
s=M$_{1/n}$OH/SiO$_2$=0-1.0, preferably 0-0.2,
t=X$_2$O$_3$/SiO$_2$=0-0.15, preferably 0-0.07,
u=YO$_2$/SiO$_2$=0-0.1, preferably 0-0.05,
v=F/SiO$_2$=0.1-3.0, preferably 0.1-2.0, and
w=H$_2$O/SiO$_2$=0.5-50, preferably 1-20.

The components of the synthesis mixture can originate from different sources and the times and conditions of crystallisation may be affected by the same.

Preferably, the thermal treatment of the mixture is carried out at a temperature of between about 130° C. and about 200° C. The thermal treatment of the reaction mixture can be performed either statically or with stirring of the mixture. After the crystallisation is complete, the solid product is separated by filtration or centrifugation and is dried. Subsequent heating at temperatures higher than 350° C., preferably between about 400° C. and 1000° C. causes decomposition of the occluded organic residues inside the zeolite and their removal, leaving the zeolite channels free.

The source of SiO$_2$ can be, for example, tetraethyl orthosilicate, colloidal silica, amorphous silica or a mixture of these.

The fluoride anion is used as a mobilising agent for the precursor species. The source of fluoride ions is preferably HF, NH$_4$F or mixtures thereof.

The organic cation or dication SDA-1, is added to the reaction mixture preferably in the form of a salt, for example, a halide, or in the form of a hydroxide and, additionally, a source of alkaline metal, alkaline earth ions or a mixture of both (M) can be added in the form of a hydroxide or a salt. The SDA-1 preferably has a structure Formula 1

In one example embodiment, some crystalline ITQ-39 material is added to the reaction mixture as crystallisation promoter in a quantity in the range of about 0.01% to about 20% by weight, preferably between about 0.05% and about 10% by weight with respect to the total added inorganic oxides.

Additionally, the materials produced herein can be pelletised in accordance with known techniques and used as catalysts or catalyser components in the transformation of organic compounds. The materials can also be used as absorbents in the absorption and separation of organic compounds. As used in these applications, the ITQ-39 material can be in its acid form and/or exchanged with suitable cations.

EXAMPLE 1

Preparation of a Dication in the Form of a Dihydroxide

The organic dication SDA-1 having the structure of Formula 1 is synthesized following a general process represented in the following schema:

D

In this general process, a reductive amination reaction is carried out of 1-propyl-4-piperidone (compound B) with pyrrolidine (compound A) giving rise to the corresponding diamine (compound C). The diamine is diquarternised by propyl halide to be transformed into the SDA-1 dication (compound D).

More specifically, the organic dication is prepared as follows: 30 g of pyrrolidine is dissolved in 200 mL of methanol and this solution is acidified with HCl (5N in methanol) to reach pH=7.5, continuously cooling the mixture in an external bath at 0° C. Then, 37 g of 1-propyl-4-piperidone are added, followed by 10.5 g of NaBH$_3$CN. The resulting mixture is maintained at ambient temperature and stirred continuously for 72 hours.

To this mixture, HCl is added slowly to reach a pH less than 2, displacing the HCN by means of a continuous current of nitrogen. The resulting solution is concentrated by means of a rotavapor and a solution of KOH (25% by weight) is added until reaching a pH higher than 12. In this step, a white precipitate appears. The resulting mixture is saturated with NaCl and poured over water. Finally, the diamine, 1-propyl-4-pyrrolidin-1-yl-piperidine, is extracted with diethyl ether and dried with anhydrous MgSO$_4$.

Figure 1:
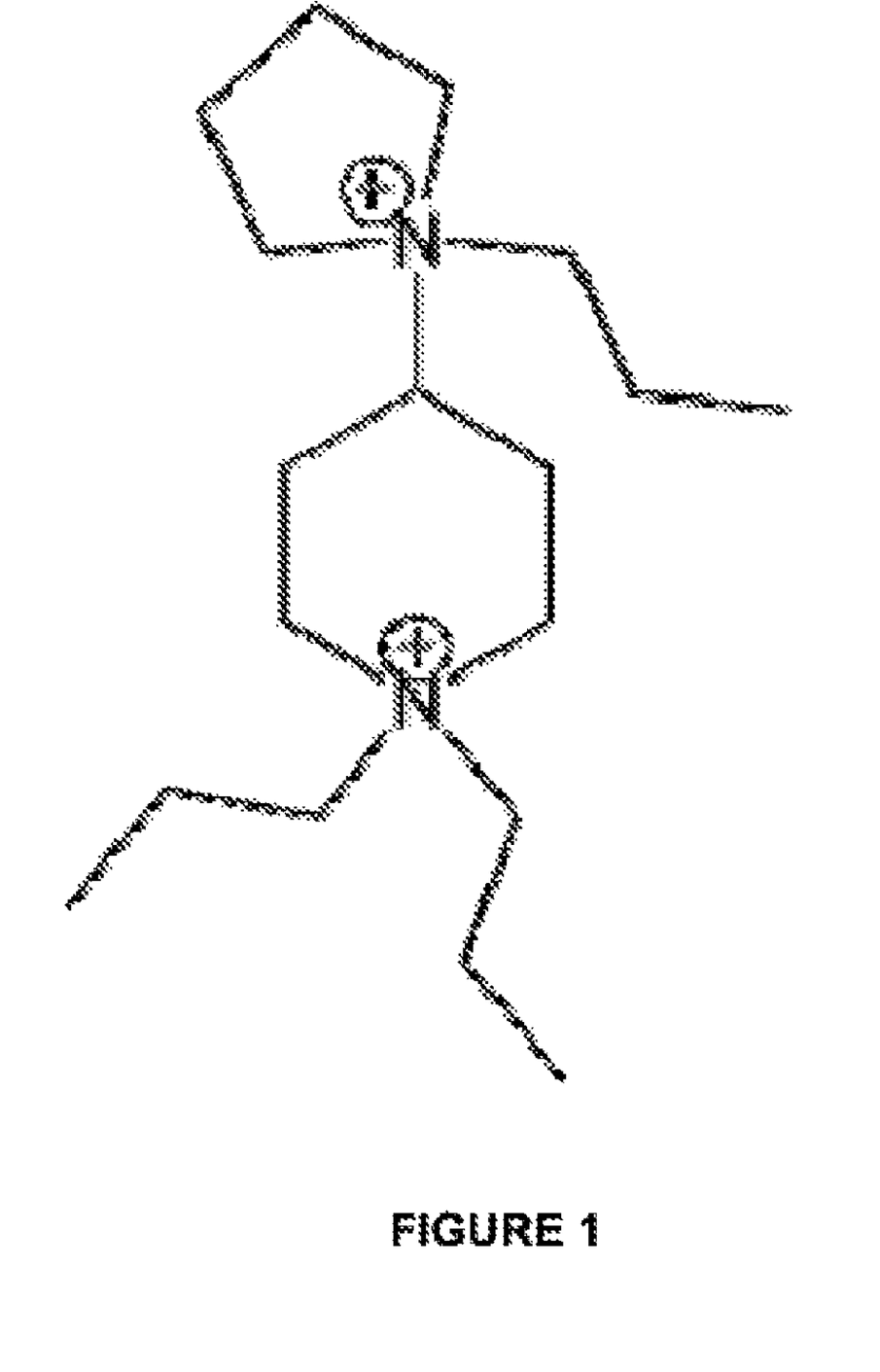
FIG. 1 illustrates the organic dication, in the presence of which the zeolite ITQ-39 is synthesised.

The quaternisation of the diamine is performed as follows: 100 g of propyl iodide are added on a solution of 43.5 g of diamine in 70 mL of MeOH. The mixture is maintained with continuous stirring at ambient temperature for 7 days, after which a white precipitate is formed. The solid is vacuum filtered. The characterisation of this solid by elemental analysis and nuclear magnetic resonance of $^1$H and of $^{13}$C confirms that it is the diiodide of the cation [SDA-1]$^{2+}$ illustrated in FIG. 1.

The iodide of the cation is exchanged for a hydroxide using an ion exchange resin in accordance with the following process: 44 mmol of the iodide of the cation ([SDA-1]I$_2$) are dissolved in water. 89 g of Dowex SBR resin are added to the solution obtained and this is maintained with stirring until the next day. Then, the mixture is filtered, washed with distilled water and a solution of the dihydroxide ([SDA-1](OH)$_2$) is obtained. This is evaluated with aqueous HCl using phenolphaline as an indicator, obtaining an exchange efficiency higher than 90%. The final solution contains 0.62 equivalents of hydroxide per 1000 g of solution.

EXAMPLE 2

Synthesis of ITQ-39

A. 0.480 g of Al isopropoxide is added over 10 g of tetraethyl orthosilicate (TEOS). Then, 39.83 g of a solution of [SDA-1](OH)$_2$ from Example 1 is added. The mixture is left evaporating while stirring until complete elimination of the ethanol from the hydrolysis of the TEOS plus the quantity of water required in reaching the final composition indicated. Finally, 1.03 g of a solution of hydrofluoric acid (48% HF by weight) is added. The composition of the gel is:
SiO$_2$:0.0245Al$_2$O$_3$:0.26[SDA-1](OH)$_2$:0.51HF:2.47H$_2$O
wherein SDA-1 is the dication illustrated in FIG. 1.

The gel is heated statically for 7 days in a steel autoclave with an internal Teflon cover at 150° C. The solid obtained after filtration, washing with distilled water and drying at 100° C. is ITQ-39.

B. 0.096 g of Al isopropoxide are added over 5 g of tetraethyl orthosilicate (TEOS). Then, 19.04 g of a solution of [SDA-1](OH)$_2$ from Example 1 is added. The mixture is allowed to evaporate while stirring until complete elimination of the ethanol from the hydrolysis of the TEOS plus the quantity of water required in reaching the final composition indicated. Finally, 0.5 g of a solution of hydrofluoric acid (48% HF by weight) is added. The composition of the gel is:
SiO$_2$:0.0098 Al$_2$O$_3$:0.25[SDA-1](OH)$_2$:0.50 HF:2.43H$_2$O
where SDA-1 is the dication illustrated in FIG. 1.

The gel is statically heated for 12 days in steel autoclave with an internal Teflon cover at 135° C. The solid obtained after filtration, washing with distilled water and drying at 100° C. is ITQ-39.

C. 0.384 g of Al isopropoxide are added over 2 g of tetraethyl orthosilicate (TEOS). Then, 8.96 g of a solution of [SDA-1](OH)$_2$ from Example 1 is added. The mixture is allowed to evaporate while stirring until complete elimination of the ethanol from the hydrolysis of the TEOS plus the quantity of water required in reaching the final composition indicated. Finally, 0.235 g of a solution of hydrofluoric acid (48% HF by weight) is added. The composition of the gel is:
SiO$_2$:0.098Al$_2$O$_3$:0.29[SDA-1](OH)$_2$:0.59HF:2.4H$_2$O
where SDA-1 is the dication illustrated in FIG. 1.

The gel is statically heated for 14 days in steel autoclave with an internal Teflon cover at 150° C. The solid obtained after filtration, washing with distilled water and drying at 100° C. is ITQ-39.

D. 1.21 g of Al isopropoxide are added over 15.94 g of tetraethyl orthosilicate (TEOS). Then, 58.55 g of a solution of [SDA-1](OH)$_2$ from Example 1 is added. The mixture is allowed to evaporate while stirring until complete elimination of the ethanol from the hydrolysis of the TEOS plus the quantity of water required in reaching the final composition indicated. Finally, 1.58 g of a solution of hydrofluoric acid (48% HF by weight) is added. The composition of the gel is:
SiO$_2$:0.039Al$_2$O$_3$:0.24[SDA-1](OH)$_2$:0.50HF:1.62H$_2$O
where SDA-1 is the dication illustrated in FIG. 1.

The gel is statically heated for 11 days in steel autoclave with an internal Teflon cover at 150° C. The solid obtained after filtering, washing with distilled water and drying at 100° C. is ITQ-39 and its X-ray diffraction pattern is shown in FIG. 2. The solid after heating in air at 580° C. for six hours maintains the zeolite structure, as can be deduced from the X-ray diffraction pattern shown in FIG. 3.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The invention claimed is:

1. A zeolite microporous crystalline material having an empirical formula:

$$x(M_{1/n}XO_2){:}yYO_2{:}SiO_2$$

wherein

M is selected from $H^+$, at least one inorganic cation of charge $+n$, or a mixture of both, X is at least one chemical element having an oxidation state of $+3$, Y is at least one second chemical element other than Si having an oxidation state $+4$, x has a value between 0 and 0.3, y has a value between 0 and 0.1, and wherein the material has an X-ray diffraction pattern comprising at least the following diffraction peaks at values of angle $2\theta$ (degrees) and relative intensities as defined in Table 2:

| $2\theta$ (degrees) ± 0.5 | Intensity ($I/I_0$) |
|---|---|
| 7.8 | mf |
| 8.6 | d (h) |
| 14.8 | d |
| 15.8 | d |
| 19.4 | d |
| 21.4 | m |
| 22.1 | f |
| 23.0 | mf |
| 26.3 | m |
| 27.6 | d |
| 32.0 | d |
| 43.9 | d | wherein d has a weak intensity between 0 and 20%, m has a medium intensity between 20 and 40%, f has a strong intensity between 40 and 60%, mf has a very strong intensity between 60 and 100%, and h is a peak of diffraction appearing as a shoulder.

2. A zeolite microporous crystalline material according to claim 1, wherein X is selected from the group consisting of Al, Ga, B, Fe, Cr and mixtures thereof.

3. A zeolite microporous crystalline material according to claim 1, wherein Y is selected from the group consisting of Ge, Ti, Sn, V and a mixture thereof.

4. A zeolite microporous crystalline material according to claim 1, wherein x is less than 0.2.

5. A zeolite microporous crystalline material according to claim 1, wherein y is less than 0.05.

6. A zeolite microporous crystalline material according to claim 1 wherein

M is selected from $H^+$, at least one inorganic cation of charge $+n$ selected from alkaline, alkaline earth metals and combinations of these and a mixture of both, where X is selected from Al, Ga, B, Fe, Cr or mixtures thereof,

Y is selected from Ge, Ti, Sn, V or mixtures thereof, and y takes a value between 0 and 0.05.

7. A zeolite microporous crystalline material according to claim 6 wherein the synthesized material has an X-ray diffraction pattern with at least the angle $2\theta$ (degrees) and the relative intensities values defined in Table 1.

8. A process for synthesising the microporous crystalline material of claim 1, comprising the steps of:

forming a reaction mixture comprising one or more sources of $SiO_2$, a source of an organic dication SDA-1 having the formula one or more sources of fluoride ions, and
water;
heating the reaction mixture to a temperature of between 80 and 200° C. until crystallisation is achieved; and
forming the microporous crystalline material of claim 1,
wherein the material has a composition, in terms of molar ratios, in the ranges:
SDA-1(OH)$_2$/SiO$_2$=0.01-1.0,
F/SiO$_2$=0.1-3.0,
H$_2$O/SiO$_2$=0.5-50.

9. A process according to claim 8, wherein the reaction mixture additionally comprises:
a source of one or more trivalent elements X, and
wherein the reaction mixture has a molar ratio of X$_2$O$_3$/SiO$_2$=0-0.15, excluding 0.

10. A process according to claim 8, wherein the reaction mixture additionally comprises:
a source of one or more tetravalent elements Y, not including Si, and
wherein the reaction mixture has a molar ratio of YO$_2$/SiO$_2$=0-0.1, excluding 0.

11. A process according to claim 8, wherein the reaction mixture additionally comprises:
a source of one or more tetravalent elements Y, not including Si,
a source of one or several more trivalent elements X, and
wherein the reaction mixture has a molar ratio of X$_2$O$_3$/SiO$_2$=0-0.15 excluding 0 and YO$_2$/SiO$_2$=0-0.1, excluding 0.

12. A process according to claim 8, wherein the organic dication SDA-1 is added in a form selected from hydroxide, another salt or a mixture thereof.

13. A process according to claim 8, wherein a quantity of crystalline material ITQ-39 is added to the reaction mixture as a crystallisation promoter in a quantity of between 0.01 and 20% by weight of the total added inorganic oxides.

14. A process according to claim 13, wherein the quantity of crystalline material ITQ-39 is added to the reaction mixture as a crystallisation promoter is in a quantity of between 0.05 and 10% by weight of the total added inorganic oxides.

15. A process for synthesising the microporous crystalline material of claim 1, comprising the steps of:
forming a reaction mixture comprising
a source of SiO$_2$,
a source of one or more tetravalent elements Y selected from the group consisting of Ge, Ti, Sn, V and mixtures thereof,
a source of one or more trivalent elements X selected from the group consisting of Al, B, Ga, Fe, Cr and mixtures thereof,
a source of inorganic cations M having a charge +n,
a source of an organic dication SDA-1 having the formula a source of fluoride ions and
water;
heating the reaction mixture to a temperature of between 80 and 200° C. until crystallisation is achieved; and
forming the microporous crystalline material of claim 1,
wherein the material has a composition in the ranges:
SDA-1(OH)$_2$/SiO$_2$=0.01-1.0,
M$_{1/n}$OH/SiO$_2$=0-1.0,
X$_2$O$_3$/SiO$_2$=0-0.15,
YO$_2$/SiO$_2$=0-0.1,
F/SiO$_2$=0.1-3.0, and
H$_2$O/SiO$_2$=0.5-50.

16. A method of transforming organic compounds comprising:
subjecting the organic compounds to a catalytic composition comprising a zeolite microporous crystalline material having an empirical formula:

$$x(M_{1/n}XO_2){:}yYO_2{:}SiO_2,$$

wherein
M is selected from H$^+$, at least one inorganic cation of charge +n, or a mixture of both,
X is at least one chemical element having an oxidation state of +3,
Y is at least one second chemical element other than Si having an oxidation state +4,
x has a value between 0 and 0.3,
y has a value between 0 and 0.1,
and wherein the material has an X-ray diffraction pattern comprising at least the following diffraction peaks at values of angle 2θ (degrees) and relative intensities as defined in Table 2:

| 2θ (degrees) ± 0.5 | Intensity (I/I$_0$) |
|---|---|
| 7.8 | mf |
| 8.6 | d (h) |
| 14.8 | d |
| 15.8 | d |
| 19.4 | d |
| 21.4 | m |
| 22.1 | f |
| 23.0 | mf |
| 26.3 | m |
| 27.6 | d |
| 32.0 | d |
| 43.9 | d | wherein
d has a weak intensity between 0 and 20%,
m has a medium intensity between 20 and 40%,
f has a strong intensity between 40 and 60%,
mf has a very strong intensity between 60 and 100%, and
h is a peak of diffraction appearing as a shoulder; and transforming the organic compounds using the catalytic composition.

17. A method for separating organic compounds comprising:
subjecting a sample comprising organic compounds to a zeolite microporous crystalline material having an empirical formula:

$$x(M_{1/n}XO_2):yYO_2:SiO_2,$$

wherein
M is selected from $H^+$, at least one inorganic cation of charge +n, or a mixture of both,
X is at least one chemical element having an oxidation state of +3,
Y is at least one second chemical element other than Si having an oxidation state +4,
x has a value between 0 and 0.3,
y has a value between 0 and 0.1,
and wherein the material has an X-ray diffraction pattern comprising at least the following diffraction peaks at values of angle 2θ (degrees) and relative intensities as defined in Table 2:

| 2θ (degrees) ± 0.5 | Intensity ($I/I_0$) |
|---|---|
| 7.8 | mf |
| 8.6 | d (h) |
| 14.8 | d |
| 15.8 | d |
| 19.4 | d |
| 21.4 | m |
| 22.1 | f |
| 23.0 | mf |
| 26.3 | m |
| 27.6 | d |
| 32.0 | d |
| 43.9 | d | wherein
d has a weak intensity between 0 and 20%,
m has a medium intensity between 20 and 40%,
f has a strong intensity between 40 and 60%,
mf has a very strong intensity between 60 and 100%, and
h is a peak of diffraction appearing as a shoulder; and
separating organic compounds from the sample.

18. A method of absorbing organic compounds comprising:
subjecting a sample comprising organic compounds to an absorbent comprising a zeolite microporous crystalline material having an empirical formula:

$$x(M_{1/n}XO_2):yYO_2:SiO_2,$$

wherein
M is selected from $H^+$, at least one inorganic cation of charge +n, or a mixture of both,
X is at least one chemical element having an oxidation state of +3,
Y is at least one second chemical element other than Si having an oxidation state +4,
x has a value between 0 and 0.3,
y has a value between 0 and 0.1,
and wherein the material has an X-ray diffraction pattern comprising at least the following diffraction peaks at values of angle 2θ (degrees) and relative intensities as defined in Table 2:

| 2θ (degrees) ± 0.5 | Intensity ($I/I_0$) |
|---|---|
| 7.8 | mf |
| 8.6 | d (h) |
| 14.8 | d |
| 15.8 | d |
| 19.4 | d |
| 21.4 | m |
| 22.1 | f |
| 23.0 | mf |
| 26.3 | m |
| 27.6 | d |
| 32.0 | d |
| 43.9 | d | wherein
d has a weak intensity between 0 and 20%,
m has a medium intensity between 20 and 40%,
f has a strong intensity between 40 and 60%,
mf has a very strong intensity between 60 and 100%, and
h is a peak of diffraction appearing as a shoulder; and
absorbing organic compounds from the sample.

* * * * *